Figure 1:
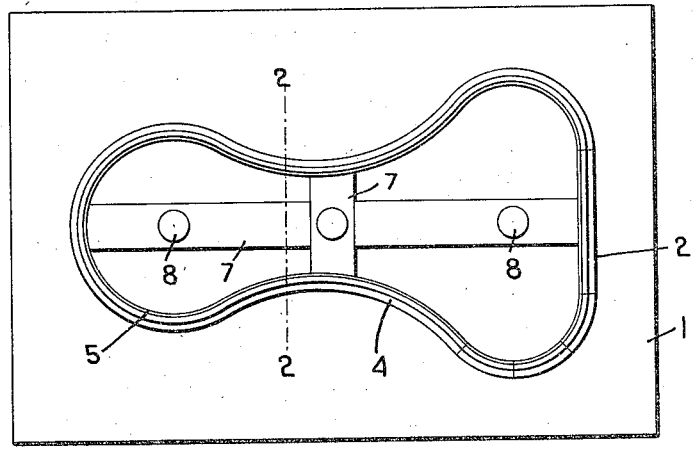

Oct. 23, 1923.

W. H. J. FITZGERALD 1,471,653

CUTTING DIE

Filed Sept. 8, 1920   2 Sheets-Sheet 1

Inventor.
William H. J. Fitzgerald
by Heard Smith & Tennant.
Attys.

Oct. 23, 1923.
W. H. J. FITZGERALD
1,471,653
CUTTING DIE
Filed Sept. 8, 1920    2 Sheets-Sheet 2
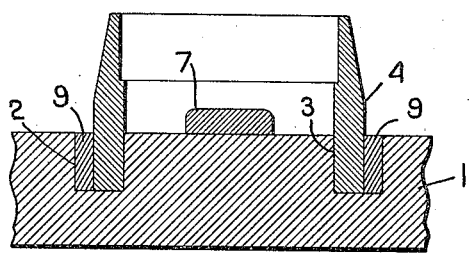
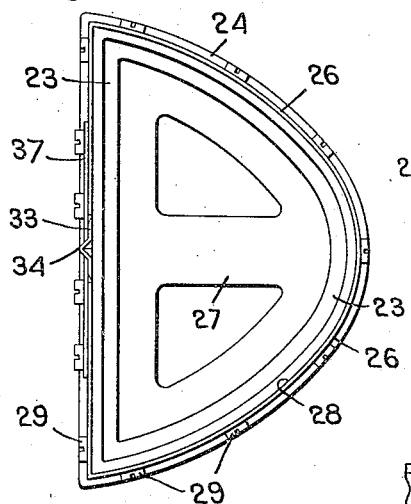
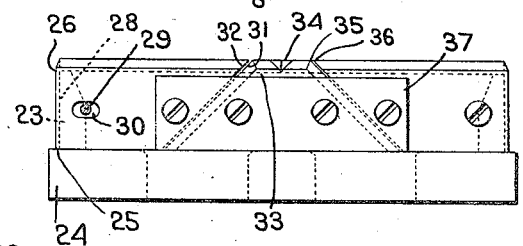
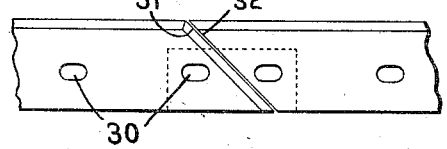
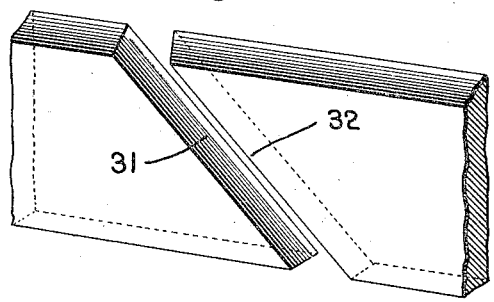
Inventor.
William H. J. Fitzgerald.
by Heard Smith & Tennant.
Attys.

Patented Oct. 23, 1923.

1,471,653

UNITED STATES PATENT OFFICE.

WILLIAM H. J. FITZGERALD, OF BRAINTREE, MASSACHUSETTS.

CUTTING DIE.

Application filed September 8, 1920. Serial No. 408,992.

*To all whom it may concern:*

Be it known that I, WILLIAM H. J. FITZGERALD, a citizen of the United States, and resident of Braintree, county of Norfolk, State of Massachusetts, have invented an Improvement in Cutting Dies, of which the following description, in connection with the accompanying drawing, is a specification, like characters on the drawing representing like parts.

This invention relates to improvements in cutting dies and like devices, the object of the invention being broadly to provide a suitable cutting die which will be accurate and effective in operation and which may be produced at a low cost.

The production of dies for cutting predetermined patterns from sheets of various materials, such as leather, metal and composition, by the present method of production, is very expensive, since the dies are constructed manually from sheets or strips of steel bent to conform to the contour of the article which is to be produced, and necessitate the employment of highly skilled workmen.

The main object of the present invention is to produce a die in which the body portion of the die will be formed of cast metal which serves as a base or support for a cutting blade of relatively thin steel which can be sharpened to produce a cutting edge and which may be clamped upon or within the cast body to form a die adapted to be employed in the usual manner.

A further object of the invention is to provide a cutting die of this character in which the cutting blade is made detachable so that it may be removed and sharpened or replaced when worn out.

A further object of the invention is to provide a non-endless cutting die having a relatively thin cutting blade in which the adjacent ends of the blade or blade sections are so constructed as to completely sever the material being cut, whereby the welding of the ends of the cutting blade may be avoided.

This is accomplished by forming the abutting ends in angular relation to the plane of the edge of the cutting blade and preferably sharpening the uppermost of said abutting ends.

A further object of the invention is to provide a cutting die in which the body portion may be formed of cast steel with a profiled wall conforming to the contour of the pattern to be produced, having a shoulder to form an abutment for the lower edge of the cutting blade which will hold the blade firmly while it is pressed into the material to be cut, suitable means being provided for clamping the blade against the profiled wall.

A further object of the invention is to provide expansible means for thus clamping the blade against the profiled wall.

Other objects and features of the invention will more fully appear from the following description and the accompanying drawings and will be pointed out in the annexed claims.

The drawings illustrate preferred embodiments of my invention as apply to cutting dies for forming conventional patterns, it being understood that the die may be so formed as to produce any desired contour.

Figure 2:
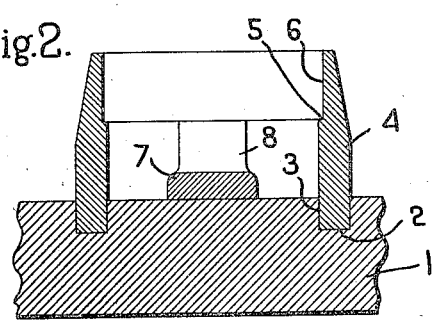
Figure 3:
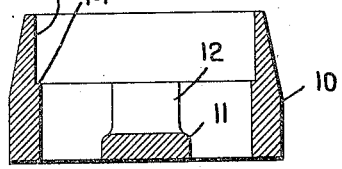
Figure 4:
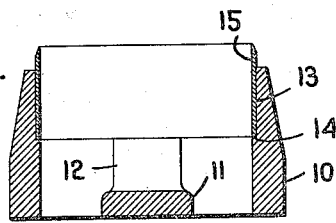
Figure 5:
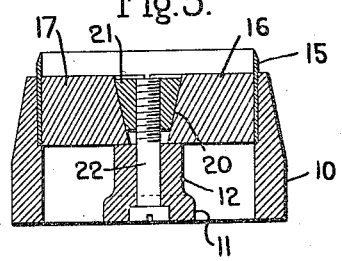
Figure 6:
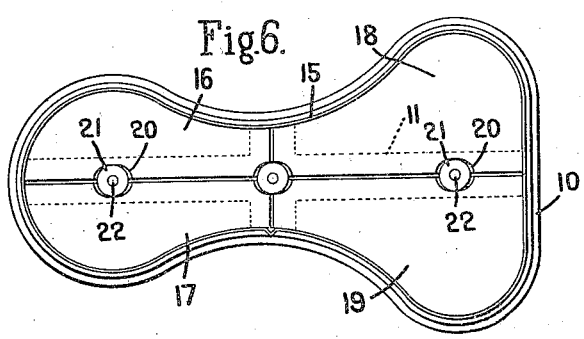

In the drawings:

Fig. 1 is a plan view of a pattern for producing the body of a die embodying the present invention, Fig. 2 is a vertical transverse sectional view on line 2—2, Fig. 1 showing only a portion of the base, Fig. 3 is a vertical sectional view through the cast die produced from the pattern, corresponding to a section on the line 2—2, Fig. 1, Fig. 4 is a similar sectional view showing the body of the die with the thin cutting blade assembled thereupon, Fig. 5 is a similar view illustrating a preferred means for clamping the cutting blade against the profiled wall of the body of the die, Fig. 6 is a plan view of the completed die, Fig. 7 is a vertical sectional view of a pattern for the body portion of a die similar to Fig. 2 showing another means for securing to the base the member or members of the pattern which form the body portion of the die, Fig. 8 is a plan view of a modified form of cutting die, Fig. 9 is a side elevation of the cutting die shown in Fig. 8 viewed from the left toward the right, Fig. 10 is a detail view showing a preferred means for securing the blade to the body of the die illustrated in Fig. 8, and, Fig. 11 is an enlarged perspective view illustrating the relative positions of the adjacent ends of the cutting blade or sections of the cutting blade adapted to form a complete severance of the material being cut.

The method of producing a die in accordance with the present invention consists, first, in forming a pattern from which the body of the die may be cast of steel, or other suitable rigid material, in such a manner as to produce an inner or an outer wall conforming in contour to the pattern which is to be cut by the die. Second: In profiling the wall of the body thus formed accurately to conform to the contour of the device to be cut. Third: In detachably clamping against the profiled wall of the body a suitable preferably non-endless blade presenting a cutting edge which projects beyond the end of the body portion of the die.

In the production of a cutting die in accordance with the present invention a pattern or template is first produced which conforms to the desired configuration, (the same being made upon a grading machine) of sufficient dimensions to allow for the shrinkage of the metal or other material from which the body portion of the die is cast. Such templates can be readily produced by usual grading machines which are employed in the production of patterns for shoes and the like, such machines being capable of producing from a single master pattern any desired sizes of the same configuration, so that by using different master patterns any form of template may be produced. From the template thus formed, or in fact from the master pattern, a groove is cut by a routing machine, or otherwise, in a suitable base, in such a manner that one of its walls will conform to the contour of the die which is to be produced.

As illustrated herein a base 1, of wood or other suitable material, is provided with a groove 2, the inner wall 3 of which conforms to the contour of the die which is to be produced. A strip, or strips, of material 4 having a cross section corresponding to the cross section of the die is then seated in the groove 2 and suitably secured therein. As illustrated in Fig. 2, this strip of material 4 is illustrated as being of a thickness to fit tightly within the groove 2 and the inner side of the strip 4 is provided with a recessed or cut-away section provided with a shoulder 5 at the bottom of a profiled wall 6 which corresponds, as accurately as may be, to the contour of the die to be produced.

Desirably a web 7, having upwardly extending bosses 8, is secured to the base 1, the bosses 8 extending upwardly to the plane of the shoulder 5 in the strip 4 which is to produce the body portion of the die. The pattern thus formed may be used to produce the cast body of the die.

In thus forming the pattern any suitable material may be employed to produce the portion of the pattern corresponding to the body of the die. Preferably a strip, or a number of strips, of flexible material such as vulcanized rubber, or wood cut cross-wise of the grain to present the proper cross section and steamed thereafter to render it flexible, may be employed, the lower end of the strip being forced into the groove 2 of the die and secured therein by glue or in any other suitable manner. Where abrupt curves and sharp angles are desired short sections of material having the proper cross section may be introduced and special sections also employed to provide for various irregularities which may be required by the form of the die to be produced, such sections being secured in the groove in any suitable manner.

As illustrated in Fig. 7 a groove having a greater width than the thickness of the body of the die is illustrated, the inner wall 3 of the groove conforming substantially to the desired contour of the die. The strips of material forming the pattern of the body portion of the die are seated in this groove adjacent the wall 3 and are forced firmly against the same by wedges 9 introduced between the outer wall of the groove and the strip 4.

The casting produced from a mould made by a pattern of this character will be in the form of a die body 10 having a general configuration corresponding to that of the device sought to be produced by the die and will have a cross section corresponding substantially to usual cutting dies.

When a pattern is provided with a web or webs 7 and bosses 8 as above described, the die body will likewise be provided with a web or webs 11 and with such bosses 12 as will correspond to the bosses 8 which are used upon the pattern. The web or webs 11 serve a twofold purpose; first, to strengthen the body portion of the die and hold it firmly during profiling operations and against expansion when the cutter is clamped against the walls of said body portion, and, second, said web or webs and the bosses thereon serve as supports for the expansible clamping members which detachably secure the blade to the body portion of the die.

After the die body has been formed, as above described, the upper portion of the wall which, as illustrated in Figs. 2, 3, 4 and 5, is the inner wall, is profiled to present a vertical surface which corresponds accurately to the contour of the device which is to be produced, Such profiling may be readily accomplished by attaching the cast die body to one of the rotating members of the profiling machine and causing the follower of the profiling machine to trace around the template or master template from which the pattern for the die was produced. In such case the profiling machine may be furnished with a milling cutter or grinding tool which may be caused to grind accurately the upper portion of the die body to produce a vertical wall 13 conforming to the contour of the device to be produced, at the same time finishing in said body a shoulder 14 adapted to support a thin steel cutting blade 15. Desirably the shoulder 14 corresponds to the thickness of the blade which is to be used, the wall 13 being cut away sufficiently to insure that the inner or cutting edge of the blade conforms to the design which it is desired to produce.

Any suitable means may be employed for securing the blade to the body of the die to cause it to conform to the contour of the profiled wall 13. This may be accomplished by driving the template, which was originally used in producing the groove in the pattern, or a duplicate of said template, into the die after the blade has been set in place, or by making a casting from said die and applying it in a similar manner. In such case the template would ordinarily be required to be "rapped" in the mould sufficiently to produce a mould cavity for the casting of a die of sufficient size to allow for the shrinkage of the metal. Such means, however, would be somewhat inaccurate and would require shaping or profiling of the casting which would be inserted in the die as a clamping member. This, however, may be avoided by dividing the template into sections and providing means for expanding the follower sections which are formed from the sections of the template.

As illustrated in Fig. 6 the template is formed in four sections 16, 17, 18 and 19, the adjacent walls of the section being provided with tapered, preferably elongated, slots 20 which are engaged by expanding members, preferably in the form of cones 21, which are drawn into said apertures by screws 22 journalled in the web 11 and bosses 12.

The upper ends of the bosses, as above pointed out, are in the same plane with the bottom of the shoulder 14 upon which the lower edge of the blade 15 rests and the blade 15 desirably is of such thickness that its upper end will lie flush with the end of the wall 13. The blade 15 may be made of any desired width to project a sufficient distance beyond the end wall of the body. The sections of the follower may, if desired, be made in skeleton form in order to decrease the weight of the die and to enable any material which remains within the cutter to be readily pushed out.

By reason of the construction above described it will be obvious that a cutting die can be made of relatively inexpensive material and provided with a cutting blade which is capable of ready removal and replacement. The blade 15 may be formed from flexible, tempered steel and bent to conform to almost any configuration. A single blade may, therefore, be employed as a cutter. If desired, however, the blade may be formed in sections and the sections may be constructed in such a manner as to produce special forms, as for example, notches such as are used to indicate particular points upon the device which is being cut to guide the workman in future manipulation of the device.

The adjacent ends of the non-endless blade, or sections of the blade, are cut at an angle to the plane of the edge of the blade and the uppermost of said edges, which has a shearing effect, is sharpened so that any material which passes between the adjacent ends of the blade is severed in strict conformity to the contour of the pattern.

By reason of this construction a die may be produced which will be accurate and which will eliminate the necessity of welding the ends of the blade which heretofore has required the employment of highly skilled workmen.

In the operation of the machine the material to be cut is ordinarily placed upon a bed formed of material which the die can penetrate, so that in use the beveled portion of the abutting edge of the blade serves to completely sever the material.

In Figs. 8 and 9 a modified form of die is illustrated in which the body portion may be produced in the same manner as that above described in reference to Figs. 1 to 6 inclusive. In the construction, however, in Figs. 8 and 9 the profiled edge which supports the cutting blade is upon the outside of the body instead of the inside thereof and is clamped to the body by screws. In forming a die of this construction other means may also be employed, such for example, as providing a template conforming to the contour of the master pattern with a base of larger dimensions to provide a shoulder or seat for the cutter and securing the blade of the cutter directly to the profiled edge of said template. If desired an original template may be used, or a casting provided corresponding to said template and base.

As illustrated herein the die comprises a body portion 23 which is formed integral with an enlarged base portion 24, the junction between the body and base portion providing a shouldered wall 25 adapted to support the lower end of the cutting blade 26. The base portion 24 desirably is provided with strengthening webs 27 which may be provided with suitable holes for positioning the body of the die properly upon a profiling machine to enable the cutter of the profiling machine to be guided properly by a suitable master pattern along the periphery of said body. The outer wall 28 of the body is profiled to conform to the desired design to be produced and the cutting blade 26 is clamped firmly against said wall. Any suitable means may be employed for securing the blade in place. A convenient means, which is illustrated herein, comprises a series of screws 29 which are seated in the body portion 23 of the die and pass through slots 30 in the blade, said slots being elongated and slightly wider than the diameter of the screws, in order to permit the blade to accommodate itself to the contour of the die, and to provide for expansion and contraction.

As illustrated in Figs 8, 9 and 10 and 11 the adjacent ends of the blade or sections of the blade are beveled to present overlapping edges 31, 32 which are inclined to the plane of the cutting edge, the edge 31 which forms an oblique angle with the edge of the blade and is the uppermost edge of the die when in use being sharpened so as to shear any material which may pass through the interval between the adjacent ends of the blade or sections of the blade, and thereby insure the complete severance of the material to be cut. By reason of this construction the thin flexible blade can be readily fitted either to an externally or internally profiled die body.

Where it is desired to introduce a special cutter, such for example, as one that cuts notches or tabs, a special blade section 33 may be introduced. Such a section is illustrated in Figs. 8 and 9 as having a V-shaped offset portion 34. In such case both ends of the section 33 are inclined relatively to the plane of the edge of the cutting blade and are suitably sharpened, thus providing a cutting edge 35 adapted to sever any material which passes into the opening between the edge 35 and the adjacent end 36 of the next section.

Where an insert of this character is provided a clamping plate 37 is used to cover the section 33 and the ends of the section adjacent to it in order to make a firm union.

It will thus be seen that by the present method a die may be produced which will be accurate in contour, since the body portion of the die may be placed in a profiling machine and any inaccuracies in casting, due to the shrinkage of the material, or other causes, may be removed.

The blade may be made of spring steel or other tempered steel of uniform thickness and caused to conform to the contour of the profiled wall of the body of the die. The blade by being clamped into the die by a profiled follower corresponding exactly to the contour and size of the device to be cut will insure the accuracy of the cutter. By this construction a die is formed in which the cutting blade can be readily removed and replaced and the beveled edges of the adjacent ends of the blade, or section of the blade, insure the proper severance of the material whether the adjacent ends abut or are separated from each other a slight distance. By reason of this feature of the invention a die may be constructed by workmen who are not skilled in the metal working art, since the accuracy in forming a blade of the proper length, which has been heretofore required, is no longer necessary.

It will be understood that the embodiment of the invention disclosed herein is of an illustrative character and is not restrictive and that various modifications in form, construction and arrangement of parts, and in the materials from which the devices are made, may be made within the meaning and scope of the following claims.

Having thus described my invention, what I claim as new, and desire to secure by Letters Patent, is:

1. A cutting die comprising a body having a wall conforming to the pattern of the article to be cut and a blade fitting and secured to said wall presenting a cutting edge projecting beyond the end of said wall, the adjacent ends of said sections being disposed in angular relation to its cutting edge, and the end forming an oblique angle with the edge of the blade being sharpened to provide a shearing edge adapted to sever any material which passes between the adjacent ends of the cutting edge in conformity to the contour of the pattern.

2. A cutting die comprising a hollow body having a shouldered inner wall conforming to the pattern to be cut, a thin tempered flexible blade presenting a cutting edge projecting beyond the end of said wall and having its opposite edge resting upon said shoulder and expansible means within said body operable to clamp said blade against said wall.

3. A cutting die comprising a hollow body having a shouldered inner wall conforming to the pattern to be cut, a thin tempered flexible blade presenting a cutting edge projecting beyond the end of said wall and having its opposite edge resting upon said shoulder, a follower having a periphery conforming to the contour of said wall, formed in sections and means for expanding said sections to clamp said blade against said wall.

4. A cutting die comprising a hollow body member having a shouldered inner wall conforming to the pattern to be cut and having integral webs connecting portions of said wall, a thin tempered blade presenting an edge projecting beyond the end of said wall and having its opposite edge resting upon said shoulder, a sectional follower having a periphery conforming in contour to said wall supported upon said web with its periphery engaging said blade and expanding means connected to said web operable to expand said follower to clamp said blade against said wall.

5. A cutting die comprising a body having a shouldered wall conforming to the pattern to be cut and a tempered non-endless cutting blade fitted and secured to said wall presenting a cutting edge projecting beyond the end of said wall and having its opposite edge resting upon said shoulder, the ends of said blade being juxtaposed and extending at an angle to the plane of the cutting edge, and the upper of said adjacent ends being formed with a cutting edge, whereby any material passing between the juxtaposed ends of the edge of said blade will be severed.

6. A cutting die comprising a non-endless cutting blade presenting a contour conforming to that of the article to be cut, the ends of said blade being juxtaposed and extending at an angle to the plane of the cutting edge, and the upper of said adjacent ends being formed with a cutting edge, whereby any material passing between the juxtaposed ends of the edge of said blade will be severed.

In testimony whereof, I have signed my name to this specification.

WILLIAM H. J. FITZGERALD.

Certificate of Correction.

It is hereby certified that in Letters Patent No. 1,471,653, granted October 23, 1923, upon the application of William H. J. Fitzgerald, of Braintree, Massachusetts, for an improvement in "Cutting Dies," an error appears in the printed specification requiring correction as follows: Page 4, line 87, claim 1, before the word "blade" insert the word *sectional;* and that the said Letters Patent should be read with this correction therein that the same may conform to the record of the case in the Patent Office.

Signed and sealed this 27th day of November, A. D., 1923.

[SEAL.]

KARL FENNING,
*Acting Commissioner of Patents.*